US007568742B2

(12) United States Patent
Kim

(10) Patent No.: US 7,568,742 B2
(45) Date of Patent: Aug. 4, 2009

(54) ANTI-THEFT SECURITY DEVICE FOR INFORMATION STORAGE MEDIA

(76) Inventor: Jee-tae Kim, Ga-301, Sung-won villa, 80, Gumi-dong, Bundang-gu, Seongnam-si, Gyeonggi-do (KR)

( * ) Notice: Subject to any disclaimer, the term of this patent is extended or adjusted under 35 U.S.C. 154(b) by 0 days.

(21) Appl. No.: 11/416,359

(22) Filed: May 1, 2006

(65) Prior Publication Data

US 2007/0000797 A1    Jan. 4, 2007

(30) Foreign Application Priority Data

May 2, 2005    (KR) ...................... 10-2005-0036753

(51) Int. Cl.
*E05C 17/56* (2006.01)
(52) U.S. Cl. ...................... 292/251.5; 292/101; 292/106
(58) Field of Classification Search ............. 292/251.5, 292/87, 81, 252, 307 R, 307 B, 95, 121, 101, 292/102, 106; 70/57.1, 63, 276, 58; 220/230, 220/4.22, 836, 843, 844, 324–326; 206/387.11, 206/308.2, 1.5, 307, 308.1, 310
See application file for complete search history.

(56) References Cited

U.S. PATENT DOCUMENTS

| 6,880,372 | B2* | 4/2005 | Kim ........................... 70/57.1 |
| 6,892,878 | B2* | 5/2005 | Hegarty et al. ........... 206/308.1 |
| 6,955,068 | B2* | 10/2005 | Gelardi ......................... 70/58 |
| 7,048,116 | B2* | 5/2006 | Hegarty et al. ........... 206/308.1 |
| 7,140,489 | B2* | 11/2006 | Lax et al. .................. 206/308.2 |
| 7,260,962 | B2* | 8/2007 | Lax et al. .................... 70/57.1 |
| 2004/0188286 | A1* | 9/2004 | Lax et al. ................. 206/308.2 |
| 2006/0144731 | A1* | 7/2006 | Solling .................... 206/308.2 |

FOREIGN PATENT DOCUMENTS

GB    2369348 A    5/2002

\* cited by examiner

*Primary Examiner*—Peter M. Cuomo
*Assistant Examiner*—Mark Williams
(74) *Attorney, Agent, or Firm*—Schweitzer Cornman Gross & Bondell LLP

(57) ABSTRACT

An anti-theft security device has a case having a front case and a rear case pivotably connected to each other and receiving information storage media in a space formed between the front case and the rear case, a hub formed at a center of an inner surface of one of the front and rear cases and to which the information storage media is detachably fixed, a separation prevention member inserted into the case through a side of the case and passing through the hub across over the information storage media fixed to the hub to prevent the information storage media from being separated from the hub, and a locking device selectively inserted along an insertion passage formed at a side of the case to prevent the separation prevention member from being separated from the case and to lock the case. According to the anti-theft security device, it is certainly possible to maintain the locked state of the case. In addition, the information storage media is not separated from the case until the case is opened and it is possible to easily perform the locking and release operations.

10 Claims, 16 Drawing Sheets

ANTI-THEFT SECURITY DEVICE FOR INFORMATION STORAGE MEDIA

CROSS-REFERENCE TO RELATED APPLICATIONS

This application claims all benefits of Korean Patent Applications No. 2005-36753 filed on May 2, 2005 in the Korean Intellectual Property Office, the disclosures of which are incorporated herein by reference.

BACKGROUND OF THE INVENTION

1. Field of the Invention

The present invention relates to an anti-theft security device for preventing theft of information storage media such as DVD, CD, video tape and the like, more particularly to an anti-theft security device for preventing theft of information storage media wherein a locking function is added to a case receiving the information storage media and thus the information storage media cannot be separated from the case unless the locking function is released.

2. Background of the Related Art

In general, information storage media such as DVD or CD is put into a case and displayed at a selling shop or lending shop. Since a size of the information storage media is small and light, there frequently occurs a case of theft. In recent years, an anti-theft security device has been widely used that a locking function is added to a case having the information storage media received therein to prevent the media from being stolen.

An example of the prior anti-theft security devices is disclosed in a Britain Patent No. 2,369,348.

FIG. 1 shows a prior anti-theft security device disclosed in the Britain patent.

As shown in FIG. 1, the prior anti-theft security device comprises a case 100 having a front case 120 and a rear case 110 pivotably connected to each other and receiving information storage media (not shown) in a space formed between the front case 120 and the rear case 110, and a locking device 140 locking the case 100 not to be opened and preventing the information storage media received in the case 100 from being separated from the case 100.

A hub 150 is formed at a center of an inner surface of the rear case 110, to which the information storage media is detachably fixed. The hub 150 is protruded from the inner center of the rear case 110, has a structure pressed down when load is applied thereto and comprises a catching step 152 formed at an end thereof. When fixing the information storage media to the hub 150, an inner periphery of an opening formed in a center portion of the information storage media is locked to the catching step 152 to fix the information storage media. To the contrary, when separating the information storage media from the hub 150, the hub 150 is pressed down to release the opening of the information storage media from the catching step 152, thereby separating the information storage media from the hub 150.

The locking device 140 comprises a first body 144 extended to be long and a second body 142 extended to be shorter than the first body 144. The locking device 140 is inserted into the case 100 through a rear ring 112 formed at a side of the rear case 110. When the locking device 140 is inserted into the case 100, the first body 144 passes through below the information storage media and the hub 150, and the second body 142 passes through a front ring (not shown) of the front case 120.

When the locking device 140 is inserted into the case 100 and the first body 144 is thus located below the hub 150, the hub 150 is not pressed down even when load is applied to the hub 150 and thus the information storage media is not separated from the hub 150. In addition, the first body 144 passes through the rear ring 112 of the rear case 110 and the second body 142 passes through the front ring of the front case 120, so that the front case 120 and the rear case 110 are locked by the locking device 140.

However, with the anti-theft security device according to the prior art, when the locking device 140 is inserted into the case 100, the locking device 140 is easily separated from the case 100 since there is no separate means for preventing the locking device 140 from being separated from the case 100.

In addition, with the anti-theft security device according to the prior art, the first body 144 of the locking device 140 is located across below the information storage media and the hub 150 and performs the locking function in a manner of limiting only a downward movement of the hub 150. Accordingly, when a user applies a strong force to pull out the information storage media, the information storage media may be separated from the hub 150.

SUMMARY OF THE INVENTION

Accordingly, the present invention has been made to solve the above problems. It is an object of the present invention to provide an anti-theft security device capable of reliably preventing an information storage media from being separated from a case as well as maintaining a locked state of the case firmly.

In order to achieve the above object, there is provided an anti-theft security device comprising: a case having a front case and a rear case pivotably connected to each other and receiving information storage media in a space formed between the front case and the rear case; a hub formed at a center of an inner surface of one of the front and rear cases and to which the information storage media is detachably fixed; and a separation prevention member inserted into the case through a side of the case and passing through the hub across over the information storage media fixed to the hub to prevent the information storage media from being separated from the hub.

In the mean time, according to an embodiment of the invention, the anti-theft security device may further comprise a locking device selectively inserted along an insertion passage formed at a side of the case to prevent the separation prevention member from being separated from the case and to lock the case.

According to an embodiment of the invention, the hub may comprise at least two elastic arms formed protrudingly from the inner center of one of the front and rear cases and pressed down when load is applied thereto; a connection member mounted to leading ends of the elastic arms to connect the elastic arms interworkingly; and a catching step formed at an outer surface of the leading end of the elastic arm. In this case, an opening formed in a center of the information storage media is locked to the catching step to lock the media and the information storage media is separated from the catching step by pressing the connection member.

In the mean time, according to an embodiment of the invention, the separation prevention member may comprise a head having a through-hole formed therein through which the locking device passes; and a body part extending from the head and crossing over the information storage media to allow an end thereof passing through a space between the connection member of the hub and the information storage media when it is inserted into the case.

In addition, according to an embodiment of the invention, the case may be made of a transparent material so as to see therein and the body part of the separation prevention member may be formed to extend in a transverse direction as well as in a longitudinal direction along which it is inserted into the case.

Meanwhile, according to an embodiment of the invention, the anti-theft security device may further comprise a coupling ring protruding from a side of the case to which the hub is formed, and the body part of the separation prevention member may pass through the coupling ring when the separation prevention member is inserted into the case.

In this case, the separation prevention member may further comprise a locking member formed protrudingly from the head, and a side of the case to which the hub is not formed may be formed with a locking ring into which the locking member is inserted when the case is closed.

According to an embodiment of the invention, the anti-theft security device may further comprise at least one engaging ring protruding from a side of the rear case and forming the insertion passage of the locking device. In this case, the locking device may comprise a housing; a movable hook coming in and out of the housing and selectively locked to the catching step formed at one side of the engaging ring; a slanted surface formed on an inner wall of the housing to be inclined downwardly; a movable body having a magnetism and rested on the slanted surface to rise and fall with being contacted to a one surface of the movable hook; and a fixing member contacting to the movable hook to fix the movable hook to a locking position. The movable hook selectively comes in and out of the housing as the movable body ascends and descends along the slanted surface.

In the mean time, the locking device may further comprise a stationary magnet mounted to an inner side of the housing, and the fixing member may comprise a body part mounted in the housing to be movable; an arm extending from a leading end of the body part and having a leading end contacting to the movable hook selectively; and a movable magnet mounted to a rear end of the body part and drawn in a direction of approaching the movable hook by a magnetic force of the stationary magnet.

In this case, according to an embodiment of the invention, the anti-theft security device may further comprise a release device for releasing the locked state of the case by the locking device, and the release device may comprise a guide recess having a width slightly larger than that of the case and extending in a longitudinal direction; a first magnet located below the movable body when the locking device is inserted into the guide recess and drawing the movable member downwardly; and a second magnet located at the rear of the movable magnet when the locking device is inserted into the guide recess and drawing the movable magnet in a direction of getting away from the movable hook.

According to an embodiment of the invention, the second magnet may be made to have a magnetic force stronger than that of the stationary magnet of the locking device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention. a detailed description of known functions and configurations incorporated herein will be omitted when it may make the subject matter of the present invention rather unclear.

Figure 1:
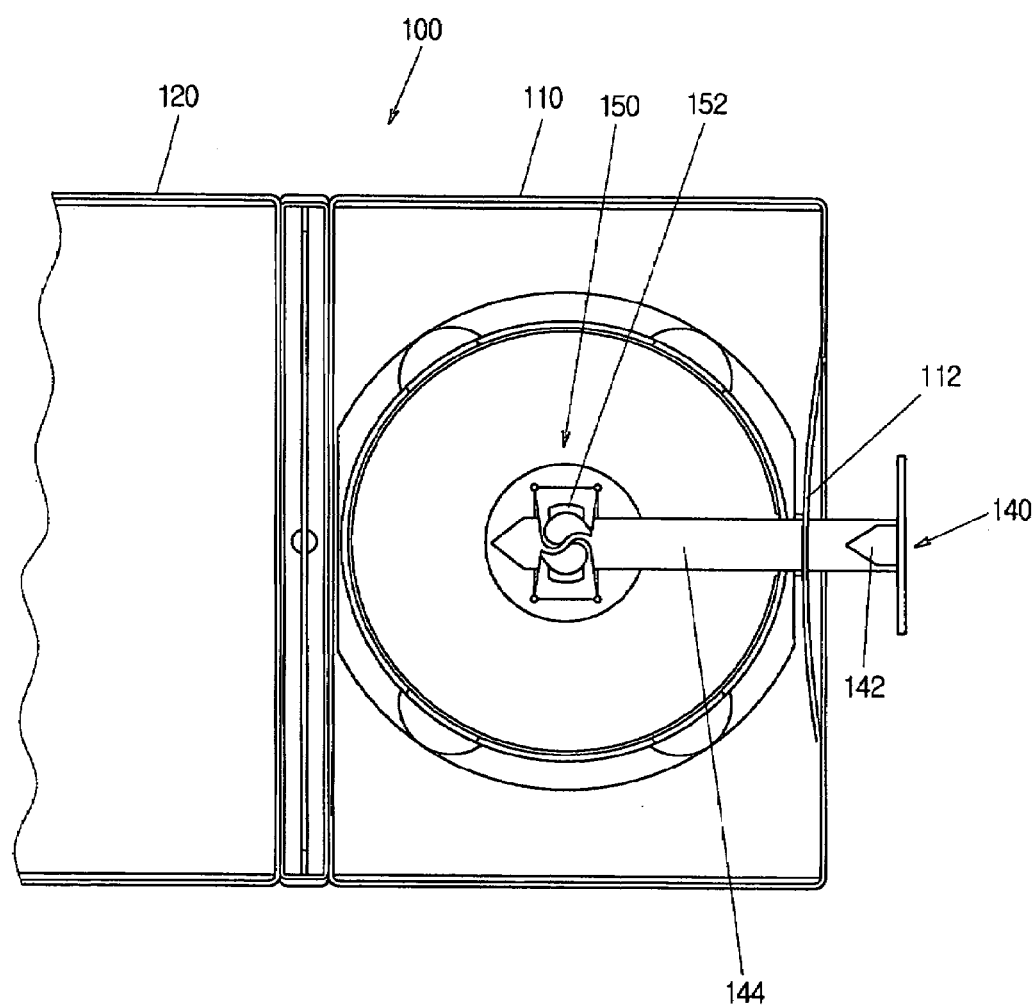
FIG. 1 is a front view of an anti-theft security device according to the prior art.
Figure 2:
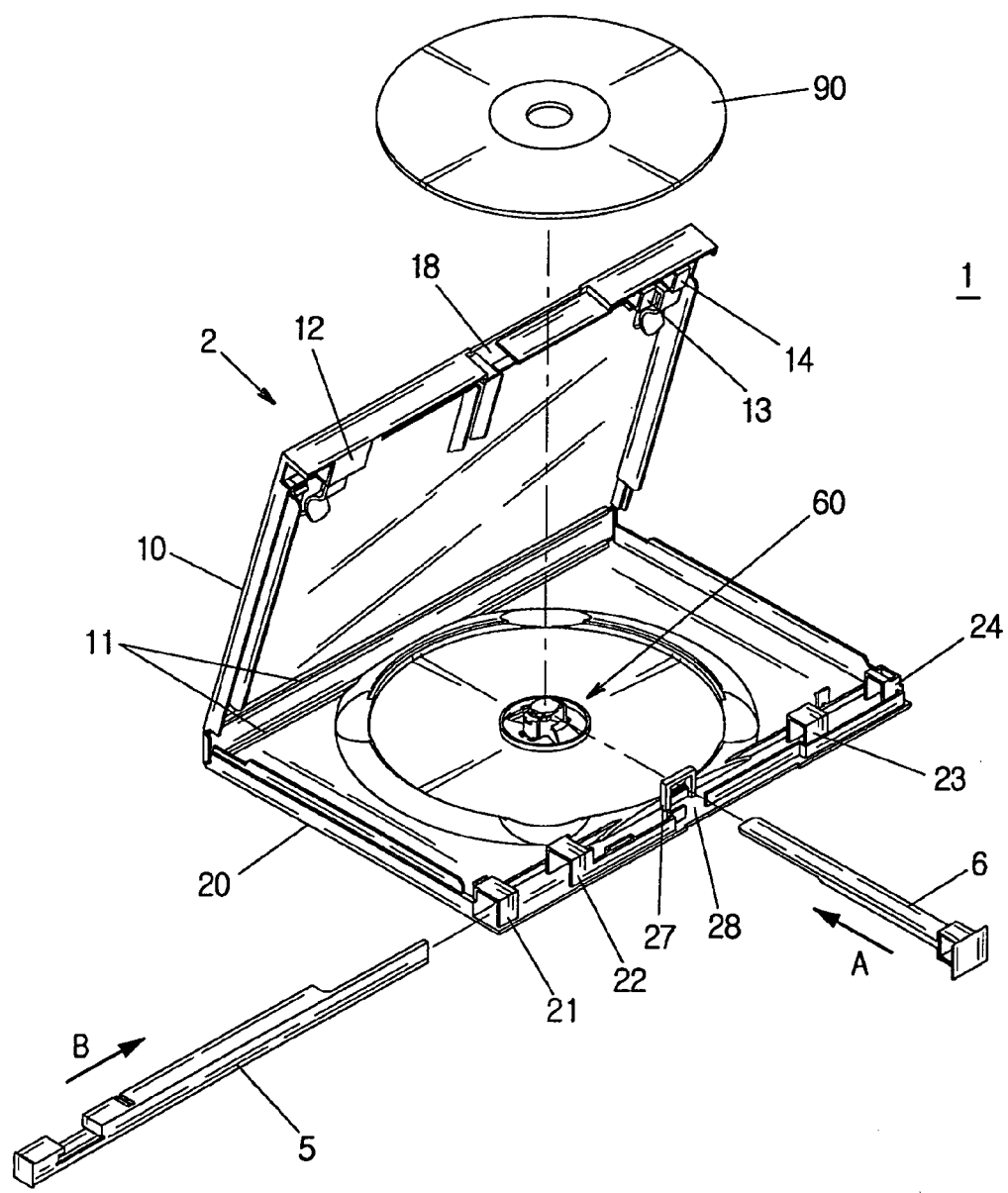
FIG. 2 is a perspective view showing a state that a separation prevention member of an information storage media and a locking device are separated from a case, in an anti-theft security device according to a preferred embodiment of the present invention.

FIG. 2 is a perspective view showing a state that a separation prevention member 6 of an information storage media and a locking device 5 are separated from an anti-theft security device I according to a preferred embodiment of the present invention.

Referring to FIG. 2, the anti-theft security device 1 according to the present invention comprises a hexahedral-shaped case 2 in which an information storage media 90 such as CD or DVD is received, a locking device 5 locking the case 2 not to be opened, and a separation prevention member 6 of the information storage media, which is separated from the case 2 only when the locking device 5 is separated from the case 2.

The case 2 comprises a front case 10 and a rear case 20 that is pivotably connected to each other and forms an internal space between them for receiving the information storage media 90. Although it is shown that the front case 10 and the rear case 20 are relatively folded and pivoted based on a folding line 11, the pivoting structure of the front case 10 and the rear case 20 is not limited to the structure shown. For example, it is also within a scope of the present invention that the front case and the rear case are connected to each other with a hinge shaft and relatively pivoted.

The separation prevention member 6 allows the information storage media 90 to be separated from a hub 60 only when the locking device 5 is separated from a side of the case 2, as described below. The separation prevention member 6 is inserted into the case 2 through openings 18, 28 formed in sides of the front case 10 and the rear case 20.

Figure 3:
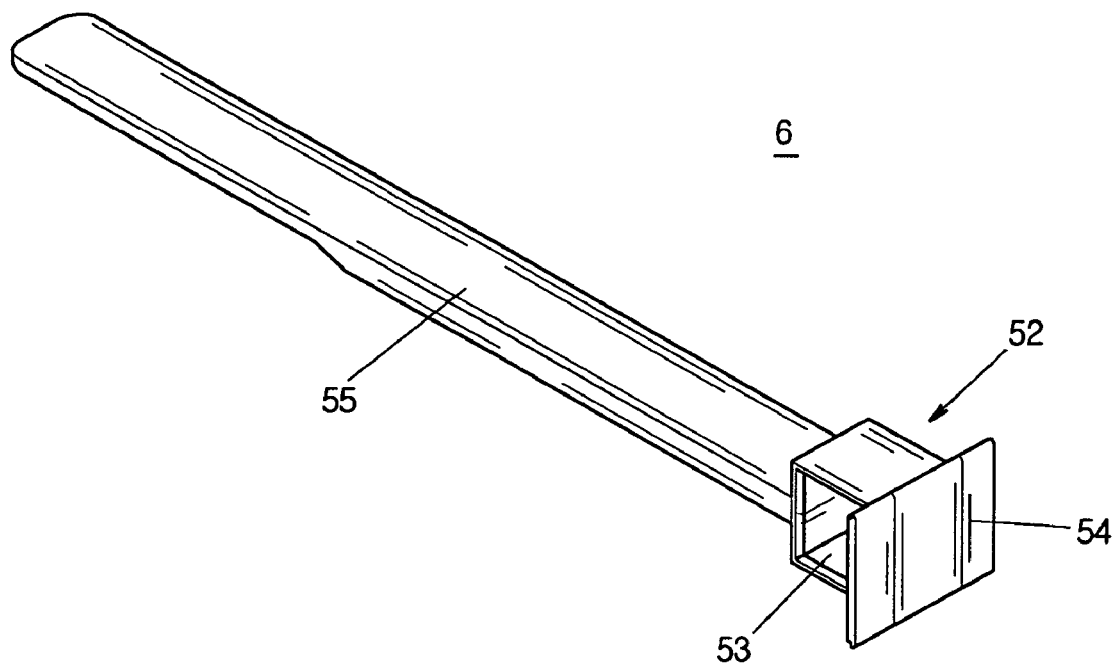
FIG. 3 is a perspective view of the separation prevention member.

The separation prevention member 6 is specifically shown in FIG. 3. Referring to FIG. 3, a head 52 of the separation prevention member 6 is formed with a through hole 53. As described below, when the separation prevention member 6 is inserted into the case 2 (see FIG. 2), the locking device 5 (see FIG. 2) passes through the through-hole 53 of the head 52 and is inserted in a side of the case 2. Accordingly, it is impossible to separate the separation prevention member 6 from the case 2 without separating the locking device 5 from the case 2.

The head 52 is formed with an elongated body part 55. The body part 55 has an elongated plate shape with a thin thickness. The head 52 of the separation prevention member 6 is preferably formed with a catching step 54 so that the head 52 is not inserted into the case 2 when the separation prevention member 6 is inserted into the case 2. In other words, the catching step 54 of the head 52 is caught with steps of the openings 18, 28 formed in the front case 10 and the rear case 20, thereby preventing the head 52 from being inserted into the case 2.

Referring to FIG. 2 again, the hub 60 is formed protrudingly from a center of an inner surface of the rear case 20, so that the information storage media 90 is detachably fixed to it. Although it is shown that the hub 60 is formed at the rear case 20, the present invention is not limited to the structure shown. For example, it is also within the scope of the present invention that the hub is formed at the front case 10.

Figure 5:
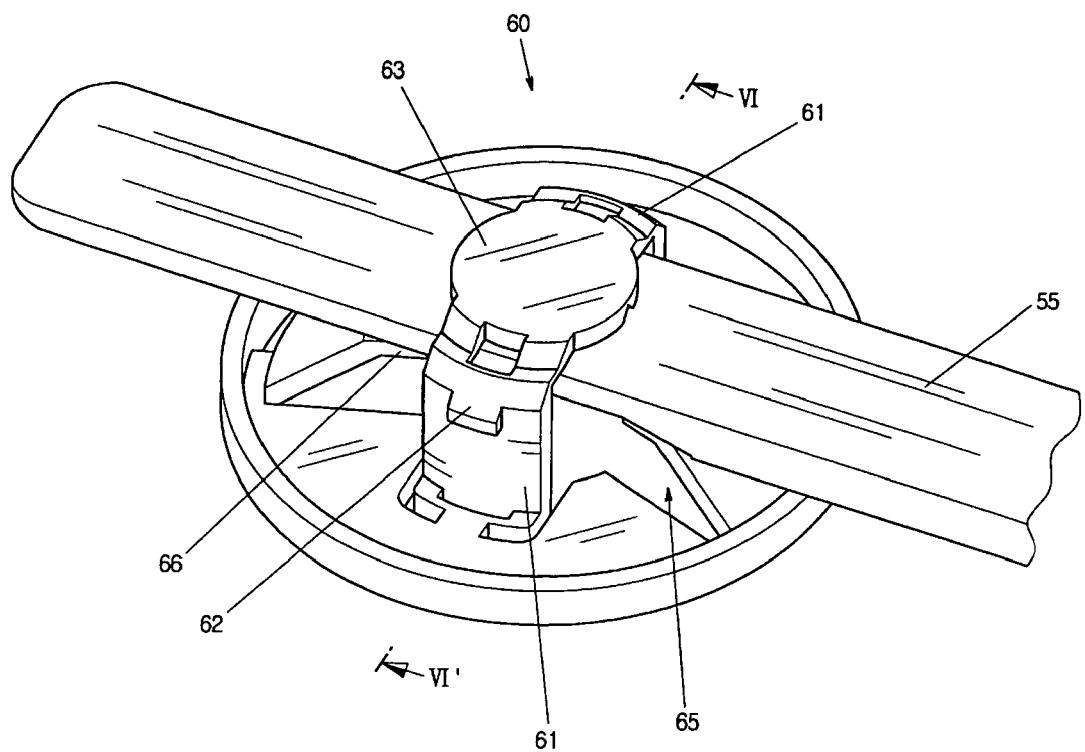
FIG. 5 is a partially enlarged perspective view of FIG. 4 showing a state that the separation prevention member passes through a hub (the information storage media is shown in FIG. 4, but it is omitted in FIG. 5 for a convenient explanation)

The hub 60 is shown in FIG. 5 in detail. Referring to FIG. 5, the hub 60 is formed protrudingly from the center of the inner surface of the rear case 20 (see FIG. 2) and comprises at least two elastic arms 61 pressed down interworkingly when load is applied thereto and a connection member 63 mounted to leading ends of the elastic arms 61 to connect the elastic arms interworkingly. A catching step 62 is formed on outer parts of the leading ends of the elastic arms 61.

According to the above embodiment, a pair of elastic arms 61 are protruded from the center of the rear case 20 to be opposite and leading ends thereof are interworkingly connected by the connection member 63. Although the elastic arms 61 are shown in a pair, the present invention is not limited thereto and the proper number of elastic arms can be selected by a skilled in the art.

The catching step 62 is formed on the outer parts of the leading ends of the elastic arms 61, respectively. Preferably, a distance between the catching steps 62 is set to be equal to a diameter of an opening formed at a center of the information storage media 90 (see FIG. 2).

When fixing the information storage media 90 to the hub 60, an inner periphery of the opening formed at the center of the information storage media 90 is locked to each of the catching steps 62 of the elastic arms 60. To the contrary, when separating the information storage media 90 from the hub 60, load is applied to the connection member 63 connecting the elastic arms 61 to press down the connection member 63 and each of the elastic arms 61 interworking with the connection member 63, so that the catching steps 62 are released from the inner periphery of the opening of the information storage media 90 to separate the media 90 from the hub 60.

In addition, the hub 60 comprises a support member 65 for supporting the separation prevention member 6 when the separation prevention member 6 is inserted into the case 2. The support member 65 protrudes upwardly while forming an angle with a surface of the rear case 20 (see FIG. 2) and has a flat part 66 parallel with the surface of the rear case 20 at a leading end thereof. Accordingly, when the separation prevention member 6 is inserted into the case 2, the body part 55 of the separation prevention member 6 is supported by the flat part 66 of the support member 65, so that the body part 55 passes through between the information storage media 90 locked to the catching steps 62 of the elastic arms 61 and the connection member 63.

Figure 4:
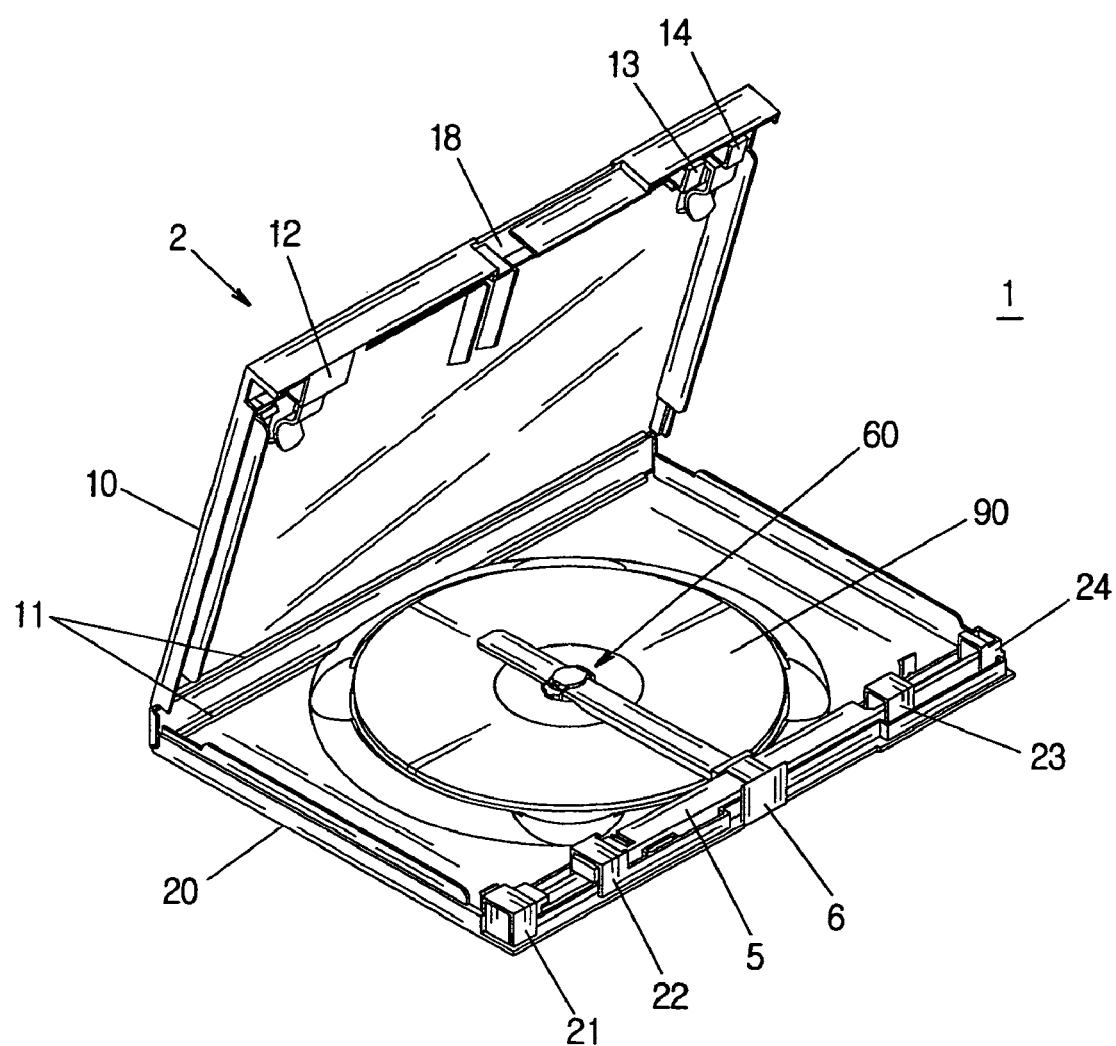
FIG. 4 is a perspective view showing a state that the separation prevention member and the locking device are combined with the case.

In FIG. 4, it is shown a combined state formed by inserting the separation prevention member 6 in a direction of an arrow A and the locking device 5 in a direction of an arrow 13 in FIG. 2 (in FIG. 4, the front case 10 is shown to be opened to illustrate an interior of the case 2).

As shown in FIG. 4, the separation prevention member 6 is firstly inserted into the case 2 through a side of the case 2 and then the locking device 5 passes through the through-hole 53 formed in the head 52 of the separation prevention member 6 (see FIG. 4). Accordingly, the locking device 5 is inserted along a side of the case 2 while passing through the separation prevention member 6.

Figure 6:
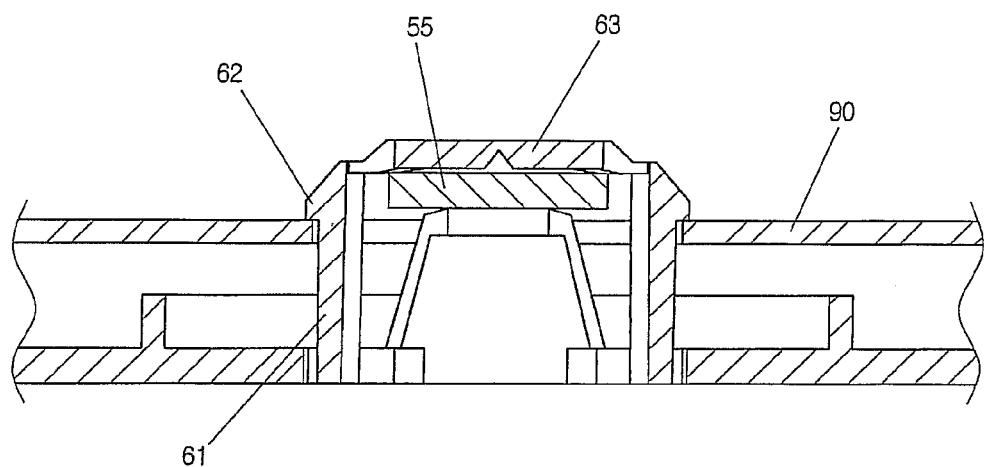
FIG. 6 is a sectional view taken along a line VI-VI' in FIG. 5 (although the information storage media is not shown in FIG. 5, it is shown in FIG. 6 for a convenient explanation)

FIG. 5 is an enlarged view showing a position of a leading end of the body part 55 under state that the separation prevention member 6 is inserted into the case 2, and FIG. 6 is a sectional view taken along with a line VI-VI' in FIG. 5 (although the information storage media is not shown in FIG. 5, it is shown in FIG. 6 for convenient explanations).

Referring to FIGS. 5 and 6, when the separation prevention member 6 is inserted into the case 2, the body part 55 is inserted across over the information storage media 90. The body part 55 of the separation prevention member 6 is located to pass through the hub 60, specifically to pass through a space between the information storage media 90 and the connection member 63 of the hub 60. Since the separation prevention member 6 is located to pass through the hub 60 and the information storage media 90, the information storage media 90 cannot be separated from the hub 60 unless the separation prevention member 6 is removed.

In the mean time, referring to FIG. 2 again, a coupling ring 27 is preferably protruded from a side of the rear case 20. When the separation prevention member 6 is inserted into the case 2, it is inserted into the case 2 through the coupling ring 27. The coupling ring 27 is located on a straight line with the hub 60 formed on the rear case 20. Accordingly, when the separation prevention member 6 passes through the coupling ring 27, the separation prevention member 6 is inserted into the case 2 without shaking and the leading end of the separation prevention member 6 passes through the hub 60 exactly.

Figure 7:
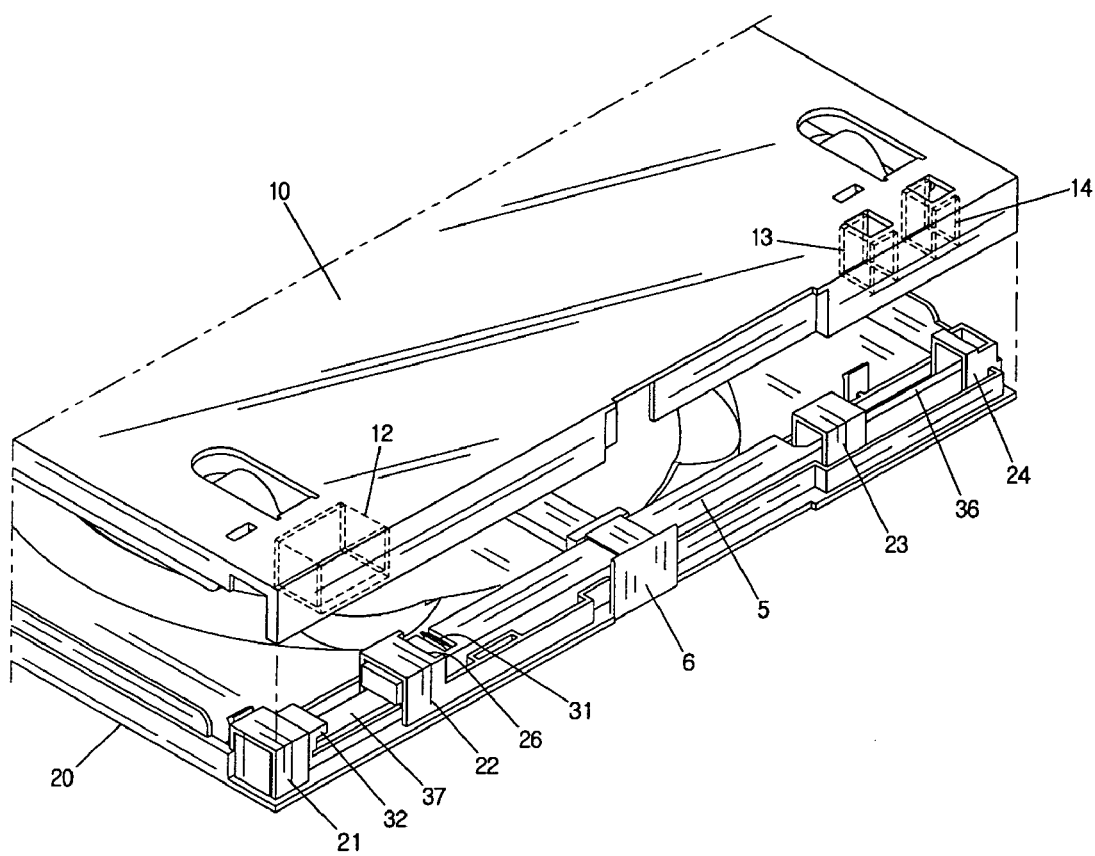
FIG. 7 is a view showing a state that the case is locked by the locking device according to an embodiment of the present invention.

FIG. 7 shows a state that the case 2 is locked by the locking device 5. Referring to FIG. 5, the case locking device 5 has a rod shape and is inserted or separated along a side of the case 2 to selectively lock the case 2. At least one engaging ring 21, 22, 23, 24 forming an insertion passage for the locking device 5 is formed protrudingly from a side of the rear case 20, and at least one fixing ring 12, 13, 14 protruded to be located in the insertion passage is formed at a side of the front case 10.

The plural engaging rings 21, 22, 23, 23 are protruded from the side of the rear case 20 at an interval in a line. The engaging rings 21, 22, 23, 24 form the insertion passage of the locking device 5. In the mean time, the first, second and third fixing rings 12, 13, 14 are protruded from the side of the front case 10 opposite to the engaging rings 21, 22, 23, 24 of the rear case 20.

As shown in FIG. 7, when the case 2 is closed, the first fixing ring 12 of the front case 10 is located between the first and second engaging rings 21, 22 of the rear case 20 and the second and third fixing rings 13, 14 of the front case 10 are located between the third and fourth engaging rings 23, 24 of the rear case 20.

The locking device 5 comprises a movable hook 31 blocked to a catching step 26 formed on a side surface of the second engaging ring 22 of the rear case 20 and a fixing hook 32 blocked to the first fixing ring 12 of the front case 10 under state that the case 2 is closed. The leading end of the locking device 5 is formed with a thin extension part 36 that is inserted into the third and fourth engaging rings 23, 24 of the rear case 20 and locked to the second and third fixing rings 13, 14 of the front case 10. In addition, the locking device 5 is formed with a recess 37 in which the first fixing ring 12 of the front case 10 is located, and the fixing hook 32 is protrudingly formed at an upper end portion of the recess 37 along a longitudinal direction of the locking device 5.

Under state that the case 2 is closed, when the locking device 5 is inserted along the insertion passage formed by the engaging rings 21, 22, 23, 24 of the rear case 20, the fixing hook 32 is locked to the first fixing ring 12 of the front case 10. In addition, the extension part 36 of the locking device 5 is locked to the second and third fixing rings 13, 14 of the front case 10, and the movable hook 31 of the locking device 5 is locked to the catching step 26, so that the case 2 is locked with being closed. That is, FIG. 7 shows that the locking device 6 is locked.

Figure 8:
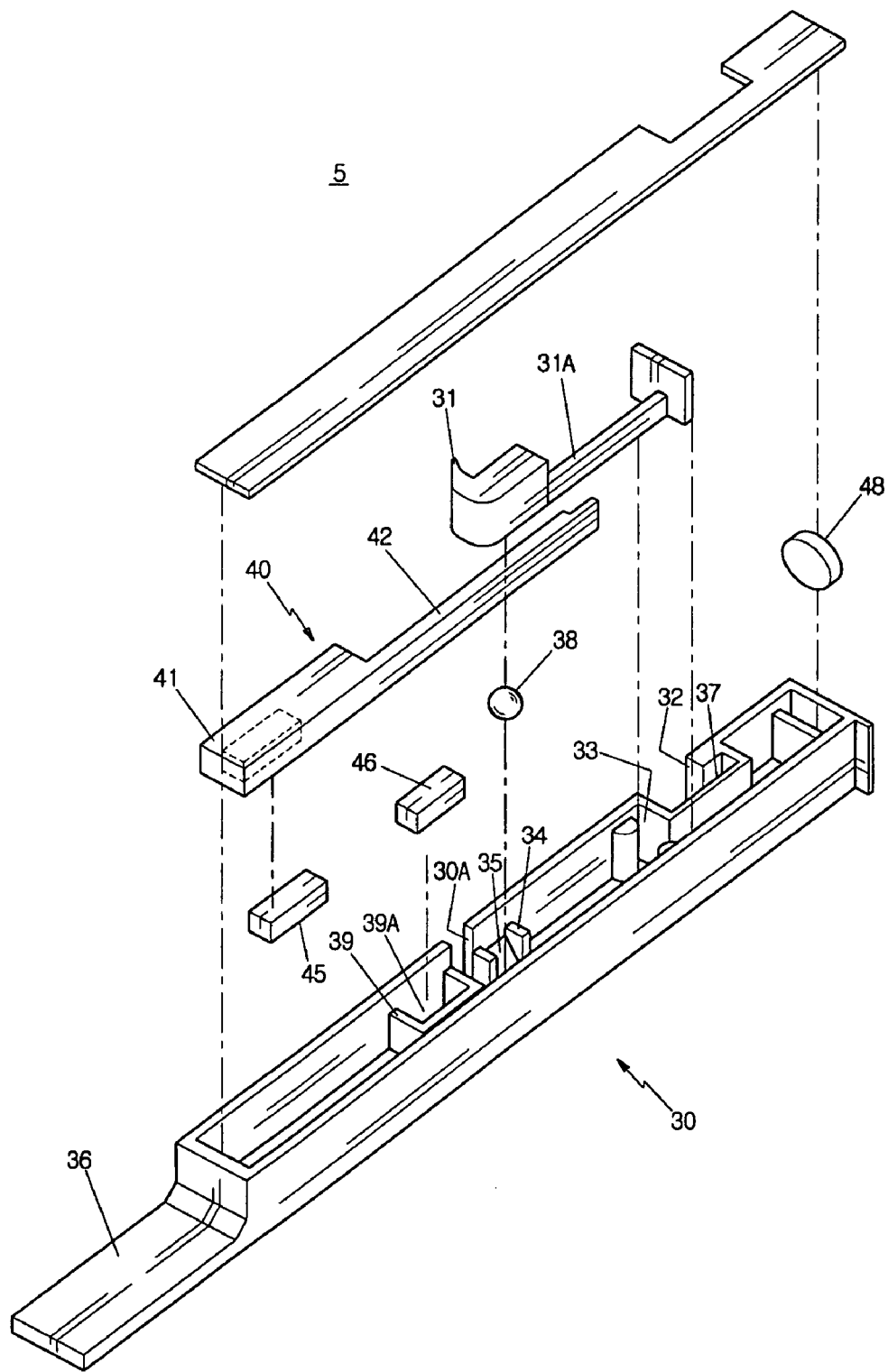
FIG. 8 is an exploded perspective view of the locking device.
Figure 9:
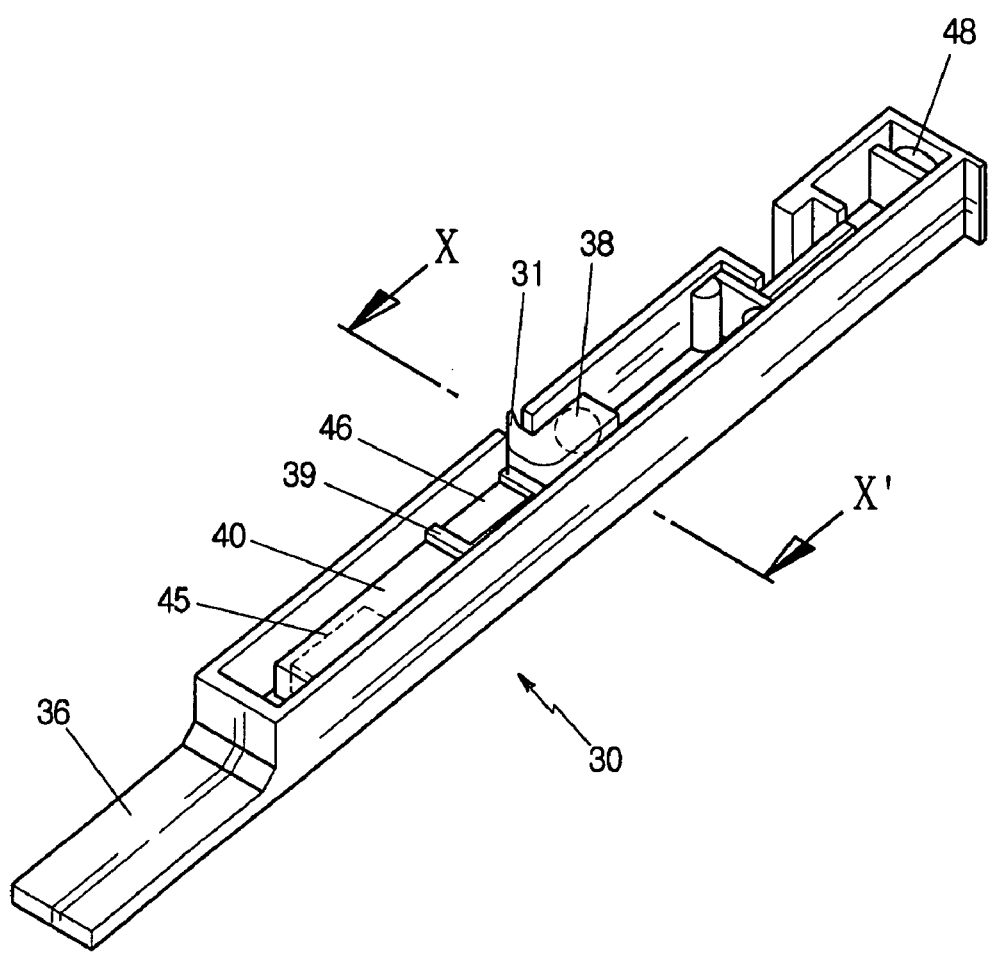
FIG. 9 is a perspective view of the locking device.

FIG. 8 is an exploded perspective view of the locking device 5, and FIG. 9 is a perspective view showing a state that the locking device 5 is combined.

As shown in FIGS. 8 and 9, the locking device 5 comprises a housing 30 having both blind ends and a rectangular pipe shape, and a slit 30A formed at a side of the housing 30 in a width direction. A cantilever type elastic arm 31A is swingably mounted in the housing 30 elastically. One end of the elastic arm 31A is inserted and fixed in a fixing recess 33 formed in the housing 30, so that it is able to swing about the fixing recess 33 when a force is applied to the other end (free end) thereof. The movable hook 31 is integratedly formed at the free end of the elastic arm 31A. The elastic arm 31A is bended from side to side in FIG. 8 along the width direction of the housing 30, so that the movable hook 31 comes in and out of the housing 30 through the slit 30A and is selectively locked to the catching step 26 (see FIG. 6) of the rear case 20.

A pair of ribs 34 are vertically formed in the housing 30 at a position adjacent to the slit 30A at a predetermined distance. A space defined by the ribs 34 is formed with a slanted surface 35 inclined downwardly from a side wall of the housing 30. A movable body 38 having a sphere and made of steel is rested on the slanted surface 35.

Figure 10A:
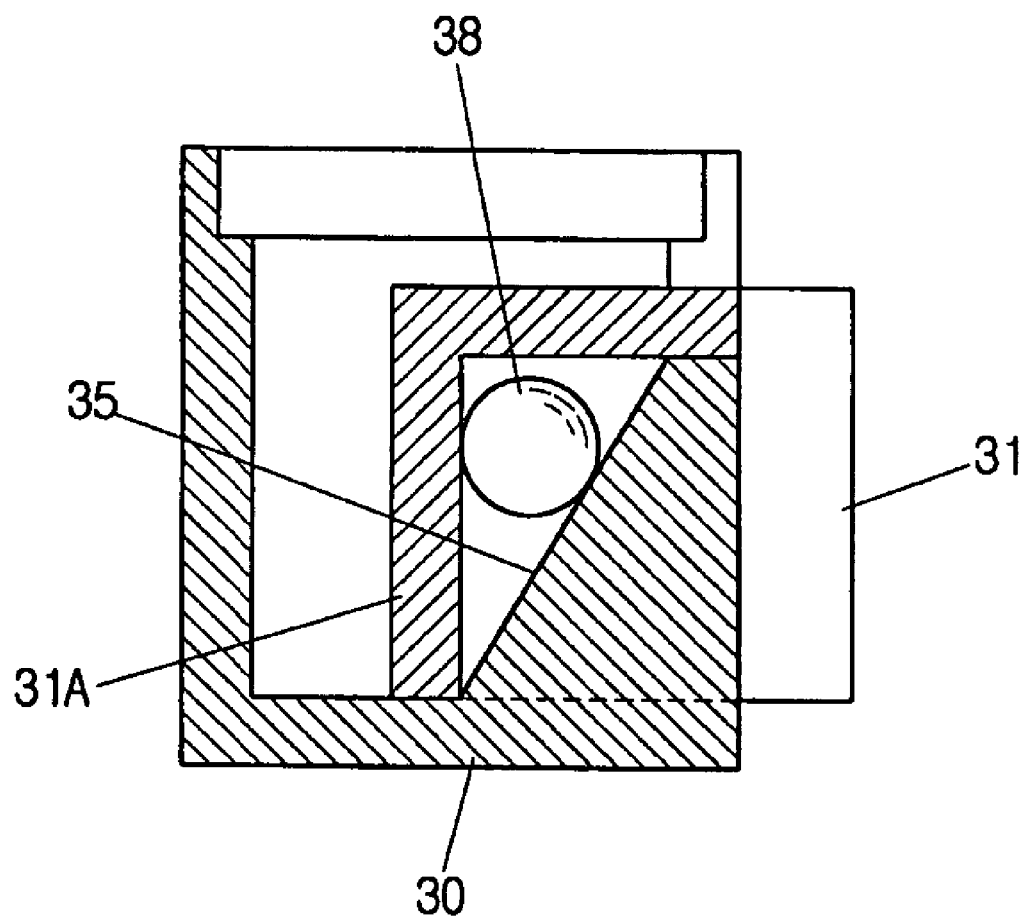
FIG. 10A is a sectional view taken along a line X-X' in FIG. 9 showing a state that a movable hook is outwardly protruded from a housing.
Figure 10B:
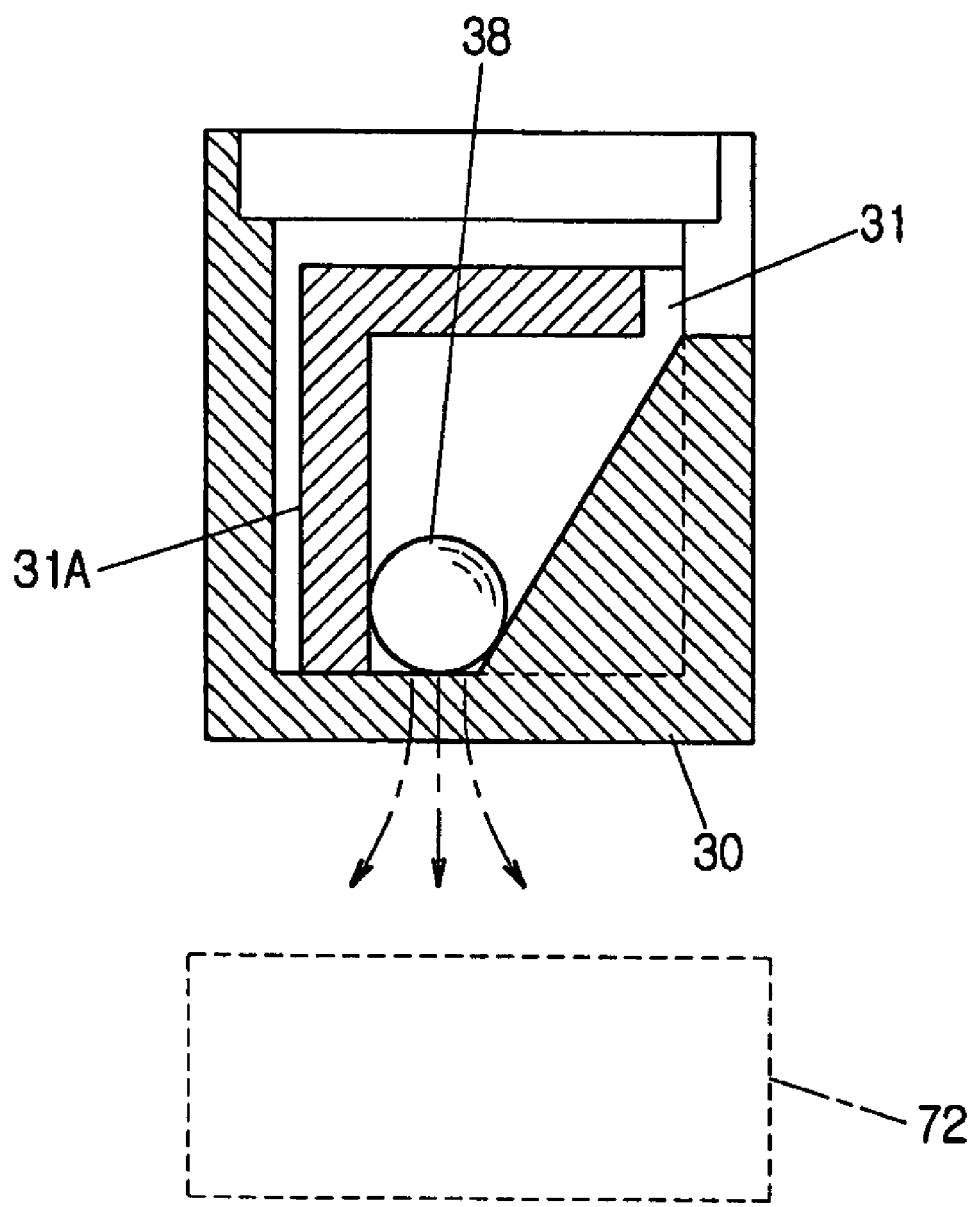
FIG. 10B is a sectional view taken along a line X-X' in FIG. 9 showing a state that the movable hook is in the housing.

As shown in FIG. 10A, the movable body 38 is rested in the space between an inner surface of the elastic arm 31A and the slanted surface 35, and swings the elastic arm 31A from side to side by ascending and descending along the slanted surface 35. FIG. 10A shows that the movable hook 31 protrudes outwardly from the housing 30 and locks to the catching step 26 (see FIG. 7) of the rear case 20. At this time, the movable body 38 is located above the slanted surface 35. Under such state, as shown in FIG. 10B, when the movable body 38 is rolled down along the slanted surface 35 until it reaches the bottom of the housing 30, the elastic arm 31A is compressed by the movable body 38 to be bended to the left in FIG. 10B.

Thereby, the movable hook 31 is escaped from the catching step 26 of the rear case 20 and thus forced to enter the housing 30, so that the locked state of the locking device 5 (see FIG. 2) is released. Like this, the locked state is released, so that the locking device 5 can be separated from the case 2 (see FIG. 2) and thus the case 2 can be opened.

The descending operation of the movable body 38 is made by a magnet 72 of a release device 70 (see FIG. 11) that will be described later. Specifically, when the magnet 72 is located at the lower part of the housing 30, the movable body 38 is descended along the slanted surface 35 by magnetic force of the magnet 72, as shown in FIG. 10B. To the contrary, when the magnet 72 gets away from the housing 30, the elastic arm 31A returns by its elastic restoring force and the movable body 38 also ascends upwardly, as shown in FIG. 10A.

In FIGS. 8 and 9, a reference numeral 40 indicates a fixing member that is positioned on a same line as the movable hook 31 and selectively contacted with the movable hook 31 to allow the movable hook 31 to be fixed to the locking position protruded from the housing 30 outwardly.

The fixing member 40 comprises a body part 41 mounted in the housing 30 to be movable along the longitudinal direction, an arm 42 extending from a lending end of the body part 41 and having a leading end contacting to the movable hook 31 selectively, and a movable magnet 45 inserted in a rear end of the body part 41. In the mean time, a space 39A surrounded by a partition 39 is defined in the side wall of the housing 30 and a stationary magnet 46 is provided in the space 39A. The movable magnet 45 is drawn toward the movable hook 31 by magnetic force of the stationary magnet 46, so that the fixing member 40 is moved to the movable hook 31. As the fixing member 40 is moved to the movable hook 31, the arm 42 of the fixing member 40 is located between the movable hook 31 and the inner wall of the housing 30. Accordingly, since the elastic arm 31A is not able to move from side to side due to the arm 42 of the fixing member 40, the movable hook 31 is fixed at the state protruded from the housing 30 outwardly, i.e., the locking position.

Accordingly, the movable hook 31 is always fixed with being protruded outwardly from the housing 30 before the locking device 5 is separated from the case 2 by the release device 70. Like this, the position of the movable hook 31 is fixed by the fixing member 40, so that it is possible to prevent the locked state from being released due to an abnormal deformation of the elastic arm 31A.

In the mean time, the movable magnet 45 is moved in a direction of getting away from the movable hook 31 by magnetic force of another magnet 73 (see FIG. 11) of the release device 70. By such movement, the fixing member 40 is entirely spaced from the movable hook 31 so that it can get away from the movable hook 31 when releasing the locking device 5.

A reference numeral 48 indicates a stationary magnet attached to the leading end of the housing 30. The stationary magnet 48 is drawn by another magnet 74 (see FIG. 11) of the release device 70 when releasing the locking device 5, thereby causing the locking device 5 to be locked in the release device 70.

Figure 11:
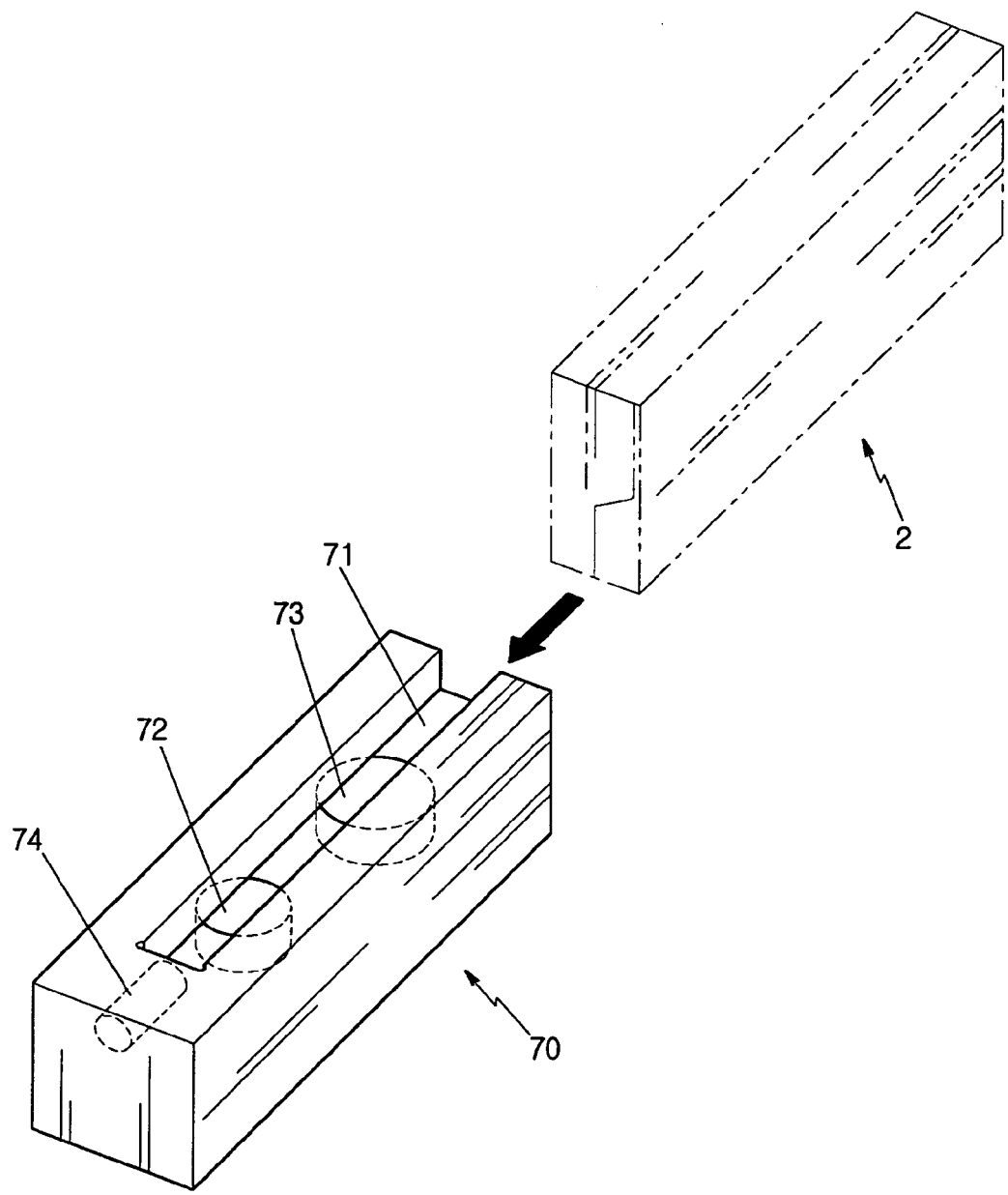
FIG. 11 is a perspective view of a release device.

FIG. 11 shows the release device 70 for separating the locking device 5 from the case 2 to release the locked state of the case 2.

As shown in FIG. 11, the release device 70 comprises a guide recess 71 having a width slightly larger than that of the case 2 and extending in a longitudinal direction, a first magnet 72 mounted under the guide recess 71 to correspond to the movable body 38 (see FIG. 8) of the locking device 5, a second magnet 73 mounted under the guide recess 71 to correspond to the movable magnet 45 (see FIG. 8), and a third magnet 74 mounted at a front of the guide recess 71 to correspond to the stationary magnet 48 (see FIG. 8). Here, the second magnet 73 consists of a magnet having a stronger magnetic force than that of the stationary magnet 46 (see. 8) of the locking device 5. When the case 2 having locking device 5 is inserted into the guide recess 71 of the release device 70 along the arrow in FIG. 11, the locked state of the case 2 is released by the magnetic forces of the magnets 72, 73, 74.

Hereinafter the releasing operation of the release device 70 will be specifically described with reference to FIGS. 12 to 14.

Figure 12:
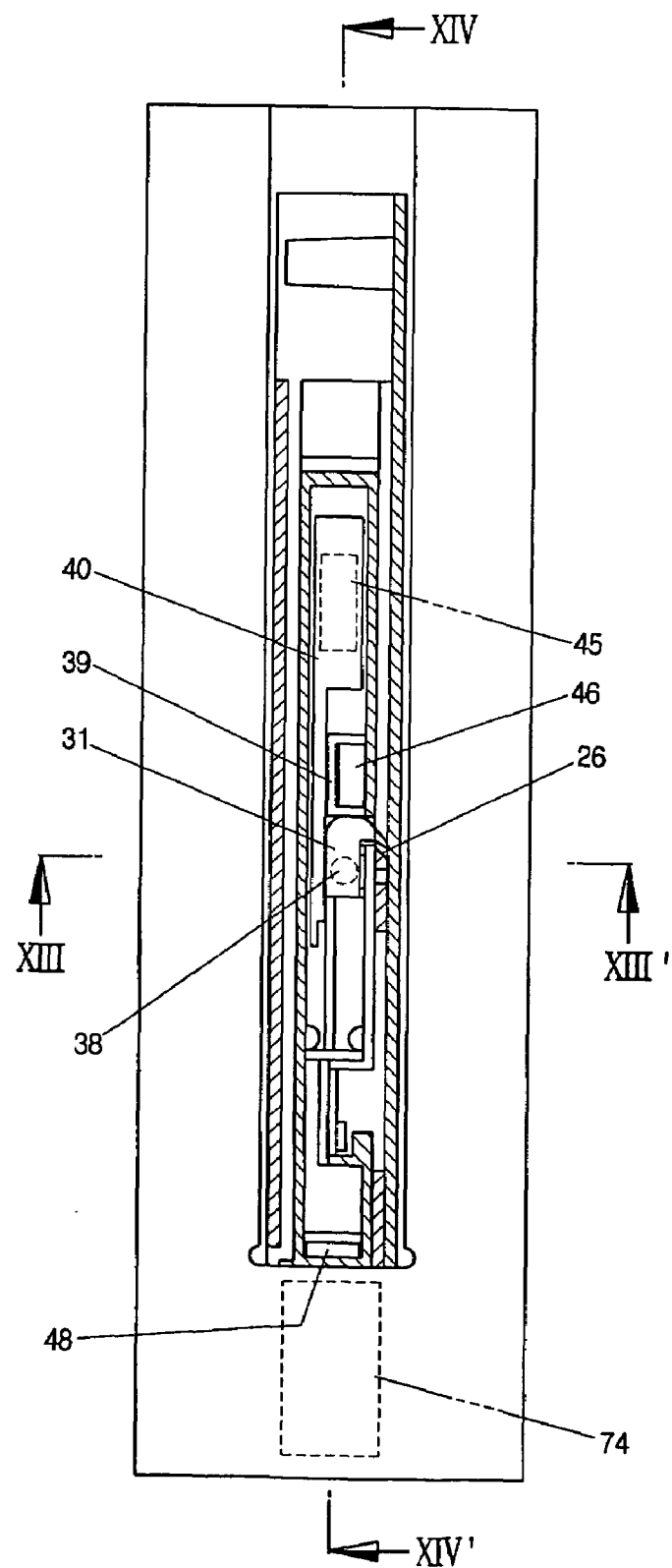
FIG. 12 is a section view of an anti-theft security device according to a preferred embodiment of the present invention, which shows a releasing operation by the release device.
Figure 14:
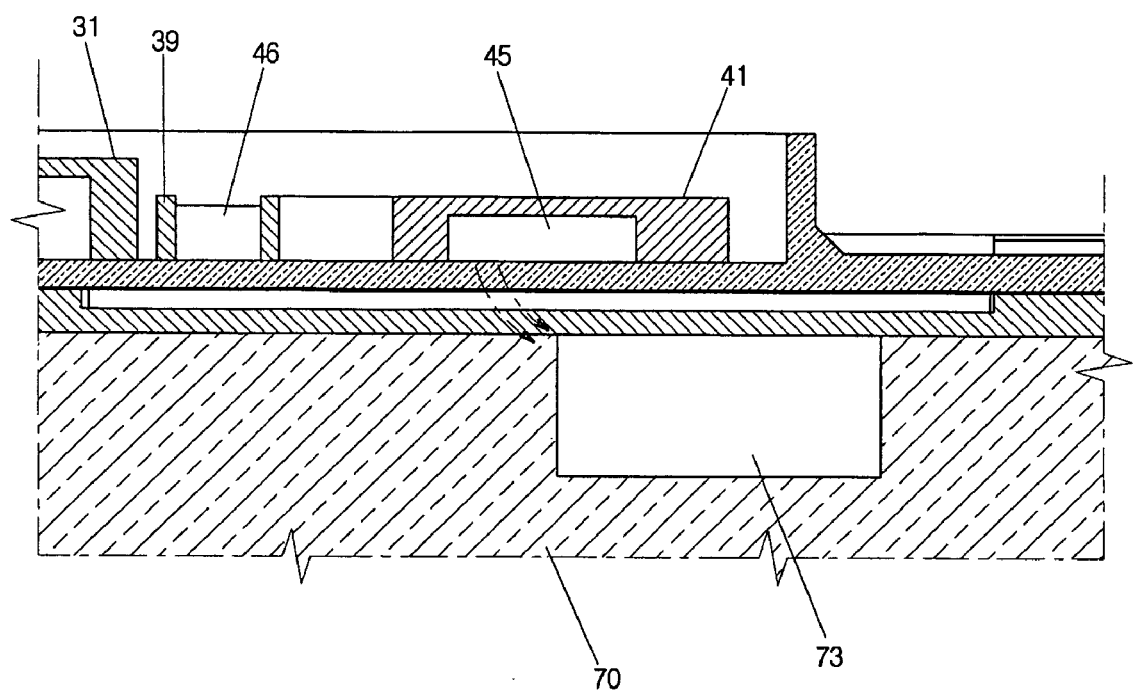
FIG. 14 is a sectional view taken along a line XIV-XIV' in FIG. 12.

First, as shown in FIGS. 12 and 14, when the case 2 is completely inserted into the guide recess 71 of the release device 70, the second magnet 73 is located at the rear of the movable magnet 45. As described above, since the magnetic force of the second magnet 73 is stronger than that of the stationary magnet 46 of the locking device 5, the movable magnet 45 is moved rearward by the magnetic force of the second magnet 73 despite the magnetic force of the stationary magnet 46. Thereby, the fixing member 40 gets away from the movable hook 31, so that the engagement of the movable hook 31 and the elastic arm 3 A (see FIG. 8) is released.

Figure 13:
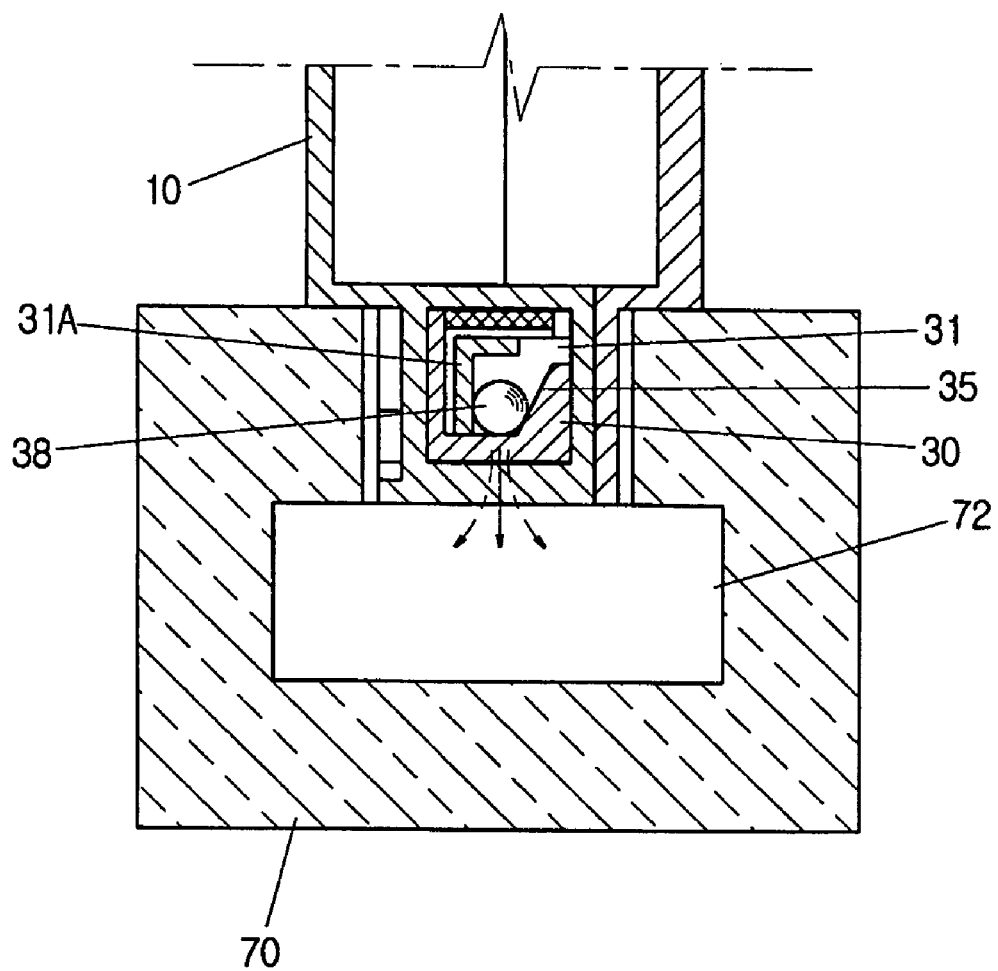
FIG. 13 is a sectional view taken along a line XIII-XIII' in FIG. 12.

As shown in FIG. 13, the first magnet 72 is located just below the movable body 38. The movable body 38 is drawn by the first magnet 72 to push the elastic arm 31A in the left direction of FIG. 13 while rolling down along the slanted surface 35. Thereby, the movable hook 3 1 is escaped from the catching step 26 (see FIG. 7) of the rear case 20, so that the locked state is released.

In the mean time, referring to FIG. 12, the stationary magnet 48 mounted at the leading end of the housing 30 is drawn by the magnetic force of the third magnet 74. Under the state, when a user pulls out the case 2 from the release device 2 while grasping the case 2 with a hand, the locking device 5 is moved relatively to the case 2 in an opposite direction, and the locking device 5 is completely separated from the side of the case 2. As a result of that, when the locking device 5 is separated and then escaped from the through-hole 53 of the separation prevention member 6, the separation prevention member 6 can be separated from the case 2 and the case 2 is opened, so that the information storage media can be released from the hub 60.

Figure 15:
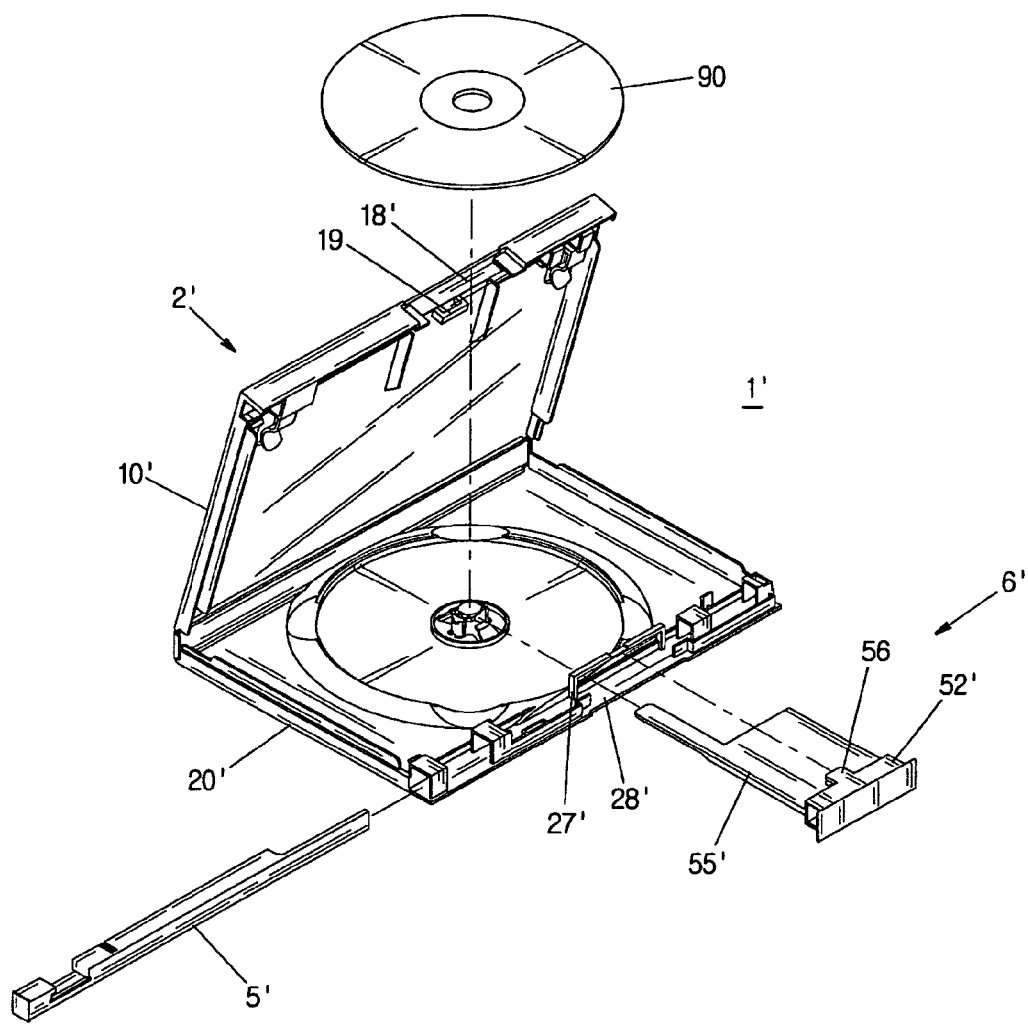
FIG. 15 is a perspective view of an anti-theft security device according to another preferred embodiment of the present invention.

FIG. 15 shows an anti-theft security device 1' according to another embodiment of the present invention.

Referring to FIG. 15, according to the anti-theft security device 1' of this embodiment, compared to the anti-theft security device 1 shown in FIG. 2, the case 2' is made of a transparent material, a locking member 56, which is separate from the body part 55', is protrudingly formed at the head 52' of the separation prevention member 6', and portions of the head 52' and the body part 55' of the separation prevention member 6' are elongated to transversely extend along a plane of the case 2'.

The openings 18', 28' which are formed at sides of the front case 10' and the rear case 20' are also elongated correspondingly to the separation prevention member 6', and the coupling ring 27' that is formed protrudingly from a side of the rear case 20' is also elongated. In addition, a locking ring 19 corresponding to the locking member 56 is protrudingly formed at a side of the front case 10'. Accordingly, when the case 2' is closed and the separation prevention member 6' is inserted into the case 2', the locking member 56 passes through the locking ring 19 of the front case 10' and the body part 56' passes through the coupling ring 27' of the rear case 20', so that an additional function of locking the case 2' separately to the locking device 5' is provided.

The body part 55' elongated along the case 2' can be adhered with a tag or sticker on which an explanation about the diverse information stored in the information storage media 90 is recorded so that a user can obtain knowledge of the information stored in the information storage media 90 by reading the tag or sticker through the transparent case 2'.

In the above embodiments, it has been illustrated that the movable hook 31 comes in and out of the housing 30 as the elastic arm 31A is bended. However, other units capable of applying the elastic force to the movable hook 31 such as spring can be used instead of the elastic arm 31 A.

In addition, in the above embodiments, it has been exemplified that the first, second and third fixing rings 12, 13, 14 are formed at the front case 10. However, only one fixing ring can be sufficient to close the case 2.

As described above, according to the present invention, since the locking device is released only by the separate release device and the information storage media cannot be separated from the hub due to the separation prevention member until the locking device is released, it is possible to prevent the theft of CD, DVD and the like.

In particular, according to the present invention, since the movable hook of the locking device is locked to the catching step of the case and the fixing hook is locked to the fixing ring of the case, it is possible to reliably lock the case. In addition, the movable hook is fixed to the locking position by the fixing member, so that it is possible to prevent the locked state from being released due to an unexpected event.

Additionally, since the separation prevention member for preventing the information storage media from being separated from the hub is separately provided and cannot be released until the locking device is released from the case, it is possible to prevent the theft of the information storage media made by cutting out a side of the case.

Further, according to the present invention, since the user can release the locked state of the case just by inserting and pulling out the case into the release device with grasping the case with a hand, she or he can easily perform the release operation using one hand only.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An anti-theft security device comprising:
    a case having a front case and a rear case pivotably connected to each other and receiving an information storage media in a space formed between the front case and the rear case;
    a hub formed at a center of an inner surface of one of the front and rear cases and to which the information storage media is detachably fixed;
    a separation prevention member inserted into the case through a side of the case and disposed between the hub and the information storage media by passing the separation prevention member through the hub across and over the information storage media fixed to the hub to prevent the information storage media from being separated from the hub; and
    a locking device selectively inserted along an insertion passage formed at a side of the case to prevent the separation prevention member from being separated from the case and to lock the case, the insertion passage comprising at least one engaging ring protruding from a side of the rear case the locking device comprising;

a housing;

a movable hook coming in and out of the housing and selectively locked to a catching step formed at one side of one of the at least one engaging ring;

a slanted surface formed on an inner wall of the housing to be inclined downwardly;

a movable body having a magnetism and resting on the slanted surface to ascend and descend with being contacted to an one surface of the movable hook; and a fixing member contacting to the movable hook to fix the movable hook to a locking position;

wherein the movable hook selectively comes in and out of the housing as the movable body ascends and descends along the slanted surface.

2. The device as claimed in claim 1, wherein the hub comprises:

at least two elastic arms formed protruding from the inner center of one of the front and rear cases and pressed down when load is applied thereto;

a connection member mounted to leading ends of the elastic arms to connect the elastic arms interworking; and a catching step formed at an outer surface of the leading end of the elastic arm, wherein an opening formed in a center of the information storage media is locked to the catching step to lock the media and the information storage media is separated from the catching step by pressing the connection member and the elastic arms.

3. The device as claimed in claim 2, wherein the separation prevention member comprises:

a head having a through-hole formed therein through which the locking device passes; and a body part extending from the head and crossing over the information storage media to allow an end thereof passing through a space between the connection member of the hub and the information storage media when it is inserted into the case.

4. The device as claimed in claim 3, wherein the case is made of a transparent material so as to see therein.

5. The device as claimed in claim 4, wherein the body part of the separation prevention member is formed with a first portion having a first width transverse to a longitudinal direction along which it is inserted into the case and a second portion having a second, lesser width transverse to the longitudinal direction along which it is inserted into the case.

6. The device as claimed in claim 3, wherein the hub is formed at a center of an inner surface of the rear case, and the rear case comprises a coupling ring protruding from a side thereof, wherein the body part of the separation prevention member passes through the coupling ring when the separation prevention member is inserted into the case.

7. The device as claimed in claim 6, wherein the separation prevention member further comprises a locking member formed protrudingly from the head, and a side of the front case is formed with a locking ring into which the locking member is inserted when the case is closed.

8. The device as claimed in claim 1, wherein the locking device further comprises a stationary magnet mounted to an inner side of the housing, wherein the fixing member comprises:

a body part mounted in the housing to be movable;

an arm extending from a leading end of the body part and having a leading end contacting to the movable hook selectively; and a movable magnet mounted to a rear end of the body part and drawn in a direction of approaching the movable hook by a magnetic force of the stationary magnet.

9. The device as claimed in claim 8, further comprising a release device for releasing the locked state of the case by the locking device, wherein the release device comprises:

a guide recess having a width slightly larger than that of the case and extending in a longitudinal direction;

a first magnet located below the movable body when the locking device is inserted into the guide recess and drawing the movable body downwardly; and a second magnet located at the rear of the movable magnet when the locking device is inserted into the guide recess and drawing the movable magnet in a direction of getting away from the movable hook.

10. The device as claimed in claim 9, wherein a magnetic force of the second magnet is stronger than that of the stationary magnet of the locking device.

* * * * *